(12) United States Patent
Lee et al.

(10) Patent No.: US 11,861,735 B1
(45) Date of Patent: Jan. 2, 2024

(54) METHOD FOR GENERATING A BALANCE SHEET THAT INCLUDES OPERATING MATERIALS AND SUPPLIES COSTS

(71) Applicants: Gilbert F. Lee, Greenbelt, MD (US); Ruth A. Maticic, Elkridge, MD (US); Tami L Ellinger, Laurel, MD (US); Deborah H. Russell, Friendship, MD (US)

(72) Inventors: Gilbert F. Lee, Greenbelt, MD (US); Ruth A. Maticic, Elkridge, MD (US); Tami L Ellinger, Laurel, MD (US); Deborah H. Russell, Friendship, MD (US)

(73) Assignee: The United States of America, as respresented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/012,890

(22) Filed: Sep. 4, 2020

Related U.S. Application Data

(60) Provisional application No. 63/046,048, filed on Jun. 30, 2020.

(51) Int. Cl.
  *G06Q 40/12* (2023.01)
  *G06Q 10/0631* (2023.01)
  *G06F 40/18* (2020.01)

(52) U.S. Cl.
  CPC .......... *G06Q 40/125* (2013.12); *G06F 40/18* (2020.01); *G06Q 10/06313* (2013.01); *G06Q 10/06315* (2013.01)

(58) Field of Classification Search
  CPC .......... G06Q 40/125; G06Q 10/06315; G06Q 10/06313; G06F 40/18
  See application file for complete search history.

(56) References Cited

U.S. PATENT DOCUMENTS 6,411,313 B1  6/2002  Conlon et al.
6,626,959 B1  9/2003  Moise et al.
(Continued)

OTHER PUBLICATIONS

Mwirigi Kiula, Identificaiton of the Limitations of Healthcare Service/Insurace Industry ERPs on Data Flow using QlikView and MS Excel, May 1, 2020, IST—Africa Conference, pp. 1-9. (Year: 2020).*

(Continued)

*Primary Examiner* — Allen C Chein
*Assistant Examiner* — Aaron N Tutor
(74) *Attorney, Agent, or Firm* — Howard Kaiser

(57) ABSTRACT

According to exemplary inventive practice, a transaction code is selected in an ERP system. The transaction code is characterized by cost elements that to a substantial degree entail OM&S costs. ERP reports are generated by drilling down from the cost elements to commitment costs, obligation costs, and actual costs, wherein drilling down from each cost element yields at least one of these three kinds of costs. Raw worksheets are generated in a spreadsheet program by importing data from the ERP reports, wherein each raw worksheet contains data from at least one ERP report. Data are derived from the raw worksheets and are combined and arranged to produce intermediate pivot tables, wherein each intermediate pivot table contains data from at least on raw worksheet. Data are derived from the intermediate pivot tables and are combined and arranged to produce a master worksheet. Data are derived from the master worksheet and are combined and arranged to produce summary pivot tables.

3 Claims, 10 Drawing Sheets

(56) References Cited

U.S. PATENT DOCUMENTS

| | | | |
|---|---|---|---|
| 10,282,407 B1* | 5/2019 | Lee | G06F 40/18 |
| 11,099,721 B2 | 8/2021 | Polson | |
| 2007/0239769 A1* | 10/2007 | Fazal | G06F 16/248 |
| | | | 707/999.102 |
| 2016/0042470 A1* | 2/2016 | Shaaban | G06Q 10/06 |
| | | | 705/30 |
| 2016/0132838 A1* | 5/2016 | Grossman | G06F 8/51 |
| | | | 705/305 |
| 2019/0332610 A1* | 10/2019 | Krishna | G06F 16/254 |
| 2020/0053409 A1* | 2/2020 | Abed | H04N 21/23418 |

OTHER PUBLICATIONS

U.S. Appl. No. 63/046,048, filed Jun. 30, 2020, inventors Gilbert F. Lee, Ruth A. Maticic, Tami L. Ellinger, and Deborah H. Russell, invention entitled "Method for Generating a Balance Sheet That Includes Operating Materials and Supplies Costs".

Secretary of the Navy Instruction 5200.44 ("Operating Materials and Supplies—Accountability and Management"), Mar. 29, 2019 (37 pages).

\* cited by examiner

| EXAMPLE OF INVENTIVELY GENERATING A BALANCE SHEET INCLUDING OM&S COSTS: Data Filtering of Six ERP Reports | |
|---|---|
| ERP Transaction Code | Cost Element |
| ZRQIS0003 – Typical Data | |
| S_ALR_87013542 – OM&S Costs | Cost Element 1511.2000 (OM&S Held for Use) – Commitments and Obligations at the WBS |
| | Cost Element 1511.2000 (OM&S Held for Use) – Actual Costs at the WBS |
| | Cost Element 6790.3000 (Other Expense and Budget) – Actual Costs at the WBS and NWA |
| | Cost Element 6790.5000 (Other Expenses Not Requiring Budgetary R...) – Actual Costs at the NWA |
| ZRQIS0002 or CN41 – Project Structure | |

FIG. 2

| OM&S Categories (SECNAVINST 5200.44) | |
|---|---|
| MHFU | Material Held for Use |
| MHFFU | Material Held in Reserve for Future Use |
| MEOU | Material Held as Excess, Obsolete and Unserviceable |
| MHFR | Material Held for Repair or Remanufacture |
| OID | OM&S in Development |

FIG. 3

Calculation of the Various Costs in the Master Worksheet

| Costs | *Costs (OM&S costs) | **Costs (Total costs with OM&S cost) |
|---|---|---|
| Budgeted | | Budgeted |
| Planned | | Planned |
| Commitments | *Commitments | **Commitments = Commitments + *Commitments |
| Obligations | *Obligations | **Obligations = Obligations + *Obligations |
| Actual | *Actuals | **Actual = Actual + *Actual |
| Assigned | *Assigned = *Commitments + *Obligations + *Actual | **Assigned = *Commitments + *Obligation + *Actual |
| Available Budget | | **Available Budget = Available Budget − **Assigned Budget |
| Remaining Plan | | **Remaining Plan = Planned − **Assigned |

FIG. 5

| # | | |
|---|---|---|
| 1 | Excel | Copy the list of Funding Documents in Excel. This list is created by the user in Excel prior to running ERP and the macros. |
| 2 | ERP | Run the transaction code ZRQJS0003, get the variant, paste the list of Funding Documents, and execute. The variant is a saved information file in ERP that contains the desired data columns for the report, e.g. Title, Commitments, Obligations, and Actual Costs. |
| 3 | ERP | Export the ZRQJS0003 to the local computer hard drive. |
| 4 | Excel | Run Macro A. Macro A imports the ZRQJS0003 report into an Excel worksheet, generates a list of Direct Project (DR) numbers, and copies the list of DR numbers into the clipboard |
| 5 | ERP | Run the transaction code ZRQJS0002, get the variant, paste the list or DR numbers in the input section, and execute in the background. |
| 6 | ERP | Run the transaction code SM37 – Overview of job selection (monitoring background job) |
| 7 | ERP | Export the ZRQJS0002 from ERP to the local computer hard drive. |
| 8 | ERP | Run transaction code S_ALR_87013542 (S_ALR), paste the list of DR numbers in the input section, and execute. Financial data from these two Cost Elements are needed. They are 1511.2 Operating Materials and Supplies Held at WBS level and 6790.5 Expenses Charged to the NWA. Under the Cost Element 1511.2, the actual costs and commitment costs at the WBS level are obtained by drilling down the S_ALR report to open the CJI3 and CJI5 reports. Under the cost element 6790.5, the actual costs at the NWA level is obtain by drilling down the S_ALR report to open the CJI3 reports. A variant is also retrieved and used for the CJI3 and CJI5 reports. |
| 9 | ERP | Export the three reports from ERP to the user's local computer hard drive. |
| 10 | Excel | Run Macro B. Macro B imports the ZRQJS0002 and three reports from S_ALR. The macro generates the intermediate pivot tables, the Master Worksheet, and the summary pivot tables (Standard 1 and Available Budget). |
| 11 | Excel | Run Macro C. Macro C generates the customized worksheet for a series of user specified Funding Documents. |

FIG. 7

| | |
|---|---|
| 1 | Run a ZRQIS0003 (Z3) with Standard Document Numbers (SDN) |
| 2 | Export Z3 report as a Spreadsheet to local computer hard drive |
| 3 | Import the report into the Excel worksheet labeled as *Z3 Reports* |
| 4 | Highlight row 1 and set Filter |
| 5 | Click on Object Number (PS) column |
| 6 | Click on the down arrow |
| 7 | Click on the Text Filters and slide over Begins With ... |
| 8 | Enter "d" in the Begins With and click OK |
| 9 | Copy all the WBS - BE from the *Z3 Reports* |
| 10 | Run S_ALR_87013542, paste the WBSs into Singles Values, and click execute |
| 11 | Find in the S_ALR_87013542 report the Cost Element 1511.2000 |
| 12 | Double click on the value in the Actual Costs column to obtain the Costs at the WBS level |
| 13 | Export the Actual Costs report |
| 14 | Import the report into the Excel worksheet labeled as *Actuals 1511.2000* |
| 15 | Double click on the value in the Commitment column to obtain the Costs at the WBS level |
| 16 | Export the Commitment Costs report |
| 17 | Import the report into the Excel worksheet labeled as *Commitment 1511.2000* |
| 18 | Find in the S_ALR_87013542 report the Cost Element 6790.3000 |
| 19 | Double click on the value in the Actual Costs column to obtain the Actual Costs |
| 20 | Export the Actual Costs report |
| 21 | Import the report into the Excel worksheet labeled as *Actuals 6790.3000* |
| 22 | Find in the S_ALR_87013542 report the Cost Element 6790.5000 |
| 23 | Double click on the value in the Actual Costs column to obtain the Actual Costs at the NWA level |
| 24 | Export the Actual Costs report |
| 25 | Import the report into the Excel worksheet labeled as *Actuals 6790.5000* |
| 26 | Click on Object Number (PS) column |
| 27 | Click on the down arrow |
| 28 | Click on the Text Filters and slide over Begins With ... |
| 29 | Enter "d" in the Begins With and click OK |
| 30 | Copy all the BE - WBS from the *Z3 Reports* |
| 31 | Click on Filter to unset Filter to return ZRQIS0003 to the original worksheet |
| 32 | Run ZRQIS0002, paste the WBS into Single Values, and click execute |
| 33 | Export the ZRQIS0002 report |
| 34 | Import the report into the Excel worksheet labeled as *Z2 Reports* |
| 35 | Before executing step 36, make sure step 31 was done (no filter applied to the Z3 report) |
| 36 | Run the macro SDN_BalanceSheet to generate the Master Worksheet and Pivot Table |

FIG. 8

| NWA | Costs |
|---|---|
| 10000053XXXX 0030 | 4,441 |
| 10000070XXXX 0020 | 7,166 |
| 10000070XXXX 0020 | 2,940 |
| 10000070XXXX 0020 | 1,167 |
| 10000070XXXX 0020 | 13,830 |
| 10000070XXXX 0020 | 93 |
| 10000073XXXX 0020 | 10,465 |
| 10000077XXXX 0020 | 212,247 |
| 10000079XXXX 0020 | 1,278 |
| 10000079XXXX 0012 | 3,666 |
| 10000079XXXX 0042 | 3,122 |
| 10000079XXXX 0082 | 6,285 |
| 10000079XXXX 0092 | 883 |
| 10000079XXXX 0030 | 2,999 |
| 10000079XXXX 0020 | 3,206 |
| 10000079XXXX 0030 | 1,778 |
| 10000079XXXX 0020 | 1,166 |
| 10000079XXXX 0020 | 2,778 |
| 10000080XXXX 0020 | 3,860 |
| 10000080XXXX 0020 | 42 |
| 10000080XXXX 0020 | 2,439 |
| 10000080XXXX 0020 | 5,599 |
| 10000080XXXX 0020 | 5,599 |
| 10000080XXXX 0020 | 11,197 |
| 10000080XXXX 0020 | 11,197 |
| 10000080XXXX 0020 | 11,197 |
| 10000081XXXX 0010 | 36 |
| 10000081XXXX 0020 | 1,925 |
| 10000081XXXX 0020 | - |
| 10000081XXXX 0030 | 11,197 |
| 10000081XXXX 0020 | 11,197 |
| 10000082XXXX 0020 | 11,197 |
| 10000082XXXX 0020 | 11,197 |

FIG. 11

| Date | NWA | Costs | Material Description |
|---|---|---|---|
| 5/22/2019 | 10000091XXXX 0020 | 230 | ADHESIVE |
| 10/01/2019 | 10000079XXXX 0020 | 2,778.24 | XXXXXXX |
| 5/28/2019 | 10000080XXXX 0020 | 2,439.07 | XXXXXX laptop computer |
| 7/14/2019 | 10000081XXXX 0010 | 12.7 | BOX,SHIPPING |
| 9/30/2019 | 10000081XXXX 0010 | 23.7 | BOX,SHIPPING |
| 8/12/2019 | 10000053XXXX 0030 | 69.84 | A/C Filters |
| 5/21/2019 | 10000053XXXX 0030 | 169.56 | BUBBLE WRAP |
| 5/21/2019 | 10000053XXXX 0030 | 135 | Shipping Boxes |
| 5/21/2019 | 10000053XXXX 0030 | 27.98 | PLUG,EAR |
| 5/21/2019 | 10000053XXXX 0030 | 3,517.62 | XXXXXXX |
| 5/21/2019 | 10000053XXXX 0030 | 134.22 | Zip Ties |
| 6/24/2019 | 10000053XXXX 0030 | 386.4 | Corrugated Boxes |
| 3/28/2019 | 10000070XXXX 0020 | 240 | XXXXXXX |
| 5/14/2019 | 10000070XXXX 0020 | 306 | XXXXXXX |
| 5/14/2019 | 10000070XXXX 0020 | 1,440.00 | XXXXXXX |
| 5/14/2019 | 10000070XXXX 0020 | 1,020.00 | XXXXXXX |
| 5/14/2019 | 10000070XXXX 0020 | 1,920.00 | Bulk Container |
| 5/14/2019 | 10000070XXXX 0020 | 160 | XXXXXXX |
| 6/10/2019 | 10000070XXXX 0020 | 1,920.00 | Bulk Container |
| 8/16/2019 | 10000070XXXX 0020 | 160 | XXXXXXX |
| 4/14/2019 | 10000070XXXX 0020 | 1,720.00 | XXXXXXX |
| 41/4/2019 | 10000070XXXX 0020 | 770 | XXXXXXX |
| 6/24/2019 | 10000070XXXX 0020 | 450 | XXXXXXX |
| 5/14/2019 | 10000070XXXX 0020 | 27.82 | XXXXXXX |
| 5/14/2019 | 10000070XXXX 0020 | 13.4 | XXXXXXX |
| 5/14/2019 | 10000070XXXX 0020 | 92.22 | OIL FILTER |
| 6/10/2019 | 10000070XXXX 0020 | 92.53 | XXXXXXX |

FIG. 10

| | 1 | 2 | 3 | 4 | 5 | 6 | 7 |
|---|---|---|---|---|---|---|---|
| 1 | Resource Sponsor | (All) | | | | | |
| 2 | Contract End Date | (All) | | | | | |
| 3 | | | | | | | |
| 4 | Standard Document Num | Object Number (PS) | Budgeted | Assigned Costs w/o OM&S | OM&S Costs | Assigned Costs w/OM&S | Available Budget w/OM&S |
| 5 | XXXXXXXXXXXX | XXXXXXXXXXXXXXXXXXXXXXX | | | | | |
| 6 | XXXXXXXXXXXX | XXXXXXXXXXXXXXXXXXXXXXX | | 70,000 | | 70,000 | (70,000) |
| 7 | | XXXXXXXXXXXXXXXXXXXXXXX | | 1,890 | | 1,890 | (1,890) |
| 8 | | XXXXXXXXXXXXXXXXXXXXXXX | | 1,413 | | 1,413 | (1,413) |
| 9 | | XXXXXXXXXXXXXXXXXXXXXXX | | 4,966 | | 4,966 | (4,966) |
| 10 | | XXXXXXXXXXXXXXXXXXXXXXX | | 4,508 | | 4,508 | (4,508) |
| 11 | | XXXXXXXXXXXXXXXXXXXXXXX | | | | | |
| 12 | | XXXXXXXXXXXXXXXXXXXXXXX | 95,500 | | | | 95,500 |
| 13 | | XXXXXXXXXXXXXXXXXXXXXXX | | | | | |
| 14 | XXXXXXXXXXXX | XXXXXXXXXXXXXXXXXXXXXXX | 95,500 | 82,777 | | 82,777 | 12,723 |
| 15 | XXXXXXXXXXXX | XXXXXXXXXXXXXXXXXXXXXXX | | | | | |
| 16 | | XXXXXXXXXXXXXXXXXXXXXXX | | | | | |
| 17 | | XXXXXXXXXXXXXXXXXXXXXXX | | | | | |
| 18 | | XXXXXXXXXXXXXXXXXXXXXXX | 10,000 | | | | 10,000 |
| 19 | | XXXXXXXXXXXXXXXXXXXXXXX | | | | | |
| 20 | XXXXXXXXXXXX | XXXXXXXXXXXXXXXXXXXXXXX | 10,000 | | | | 10,000 |
| 21 | XXXXXXXXXXXX | XXXXXXXXXXXXXXXXXXXXXXX | | 2,987 | | 2,987 | (2,987) |
| 22 | | XXXXXXXXXXXXXXXXXXXXXXX | | | | | |
| 23 | | XXXXXXXXXXXXXXXXXXXXXXX | | | | | |
| 24 | | XXXXXXXXXXXXXXXXXXXXXXX | 10,000 | | | | 10,000 |
| 25 | | XXXXXXXXXXXXXXXXXXXXXXX | | | | | |
| 26 | XXXXXXXXXXXX | XXXXXXXXXXXXXXXXXXXXXXX | 10,000 | 2,987 | | 2,987 | 7,013 |
| 27 | XXXXXXXXXXXX | XXXXXXXXXXXXXXXXXXXXXXX | | | | | |

FIG. 12

METHOD FOR GENERATING A BALANCE SHEET THAT INCLUDES OPERATING MATERIALS AND SUPPLIES COSTS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to data analysis, more particularly to methods and systems for selectively using data from a collection of data to produce a visual presentation such as a balance sheet.

Project managers (PMs) and project business financial managers (PBFMs) render visual presentations, such as balance sheets, to keep track of the expenses and remaining funds for multiple network activities (NWAs). The rendering of a suitable visual presentation is often not a straightforward task. For instance, it may be laborious to prepare a balance sheet that displays specific information derived from a comprehensive report.

The term "Enterprise Resource Planning" (ERP) is commonly used to refer to an integrative technological approach, typically involving business management software, to managing business processes from a variety of business activities of an organization. Navy ERP is the financial system of record for the United States Department of the Navy (DON). As in many organizations, project managers and project business financial managers employed by the Navy seek to obtain balance sheets to track the expenses and available budgets for multiple funding documents or sales orders.

"Operating Materials and Supplies" (OM&S) is a broad category of expenses that is sometimes overlooked or underestimated in financial reporting, especially since OM&S costs are not easily accessible in many familiar ERP transaction codes. It is desirable to provide a better methodology for reporting the budget, expenses, and available budget by funding document, wherein the expenses include OM&S costs.

SUMMARY OF THE INVENTION

In view of the foregoing, an object of the present invention is to provide a better methodology for creating a balance sheet that reflects, inter a/ia, operating materials and supplies (OM&S) costs.

Exemplary practice of the present invention provides "on-demand" financial reporting of multiple funding documents. A financial report is inventively obtained quickly, conveniently, and accurately, much to the benefit of project managers, project business financial managers, and financial analysts.

The present invention may be embodied, for example, as a computer-implemented method, an apparatus including a computer, or a computer program product. Exemplary inventive practice generates a balance sheet based on information contained in an enterprise resource planning system. As further described hereinbelow, an exemplary inventive embodiment includes performance of steps that are dichotomized in terms of (i) steps performed in an enterprise resource planning system, and (ii) steps performed in a spreadsheet program.

In the enterprise resource planning system, at least one transaction code is selected that includes a plurality of cost elements that are each substantially directed to operating materials and supplies costs. A plurality of enterprise resource planning reports is generated. The generating of the enterprise resource planning reports includes drilling down, from the cost elements, to costs associated with commitments, obligations, and actual costs. The generating of each enterprise resource planning report includes drilling down, from at least one cost element, to costs associated with commitments and/or obligations and/or actual costs.

In the spreadsheet program, a plurality of raw spreadsheet worksheets is generated. The generating of the raw spreadsheet worksheets includes importing data from the enterprise resource planning reports. The generating of each raw spreadsheet worksheet includes importing data from at least one enterprise resource planning report. A plurality of intermediate pivot tables is generated. The generating of the intermediate pivot tables includes organizing data from the raw spreadsheet worksheets. The generating of each pivot table includes organizing data from at least one raw spreadsheet worksheet. A composite spreadsheet report is generated. The generating of the composite spreadsheet report includes combining data from the pivot tables. A plurality of summary pivot tables is generated. The generating of each summary pivot table includes organizing data from the composite spreadsheet report.

A practitioner of the present invention is thus afforded the capability of generating, in the spreadsheet program, at least one customized spreadsheet worksheet. The generating of each customized spreadsheet worksheet includes organizing data from the composite spreadsheet report and/or from at least one summary pivot table.

The present invention, as exemplarily embodied, is capable of capturing various financial data to generate summary reports according to items including standard document number, high level sponsor, appropriation, contract end date, and OM&S costs. Program and financial managers are particularly interested in obtaining summaries of financial data that are inclusive of the OM&S charges. Exemplary practice of the present invention automates the process of working with hundreds or thousands of funding documents so as to provide an "on demand" comprehensive financial report for project managers, project business financial managers, and financial analysts.

Many financial reports are inaccurate because they fail to report, or accurately report, the OM&S costs. The main difficulty lies in the retrieval of the OM&S costs from a financial system such as ERP. Many project managers and project business financial managers working in ERP have used ERP transaction codes CJI3 and CJI5 in order to identify the OM&S costs. The present inventors found that CJI3 and CJI5 did not correctly identify all of the OM&S costs, and that an alternative ERP transaction code (S_ALR_87013542) proved to be a superior solution. An exemplary inventive method is fast and efficient as compared to previous approaches taken by project managers, project business financial managers, and project financial analysts.

Exemplary inventive practice is capable of capturing all expenses —including OM&S costs, budget, and available budget—for as many as hundreds or thousands of funding documents. An inventive embodiment of a financial expense-capturing method features novel implementation of, inter alia, (i) Enterprise Resource Planning (ERP) transaction code S_ALR_87013542 and (ii) at least one Microsoft Excel macro. The transaction code S_ALR_87013542 is unfamiliar to many financial professionals. According to exemplary inventive practice, one or more Excel macros data-filter ERP reports and present resultant balance sheet data in the form of one or more pivot tables.

As compared with the most commonly used ERP transaction codes for seeking OM&S data, viz., CJI3 and CJI5, the transaction code S_ALR_87013542 has been shown by the present inventors to be more accurate and convenient in identifying and determining the OM&S costs. Among all of the ERP transaction codes, the present invention recognizes the uniqueness of ERP transaction code S_ALR_87013542 insofar as it is capable of segregating and displaying desired OM&S costs in a report in terms of three cost element categories, viz., 1511.2000, 6790.3000, and 6790.5000.

According to conventional financial information practice using ERP, generation of a balance sheet that represents all expenses—including budget, available budget, and OM&S costs—requires manipulation of hundreds, thousands, or even millions of pieces of data, depending on the numbers of funding documents and associated network activities. This task is quite labor-intensive in Excel if done by hand, such by inserting formulas and cutting, copying, and pasting among multiple worksheets. This significant increment of work has led to less frequent generation of financial reports, for instance in some organizations once every two weeks or once a month. The present invention avails itself of the macro capabilities of Excel to perform data-filtering, manipulation, and pivot table generation in a fast, convenient, and accurate manner.

BRIEF DESCRIPTION OF THE DRAWINGS

The present invention will now be described, by way of example, with reference to the accompanying drawings, wherein:

FIG. 2 is a table setting forth ERP transaction codes and corresponding cost elements that are implemented in accordance with an embodiment of the present invention.

FIG. 3 is table setting forth the five categories of OM&S costs as designated by Secretary of the Navy Instruction 5200.44.

FIG. 5 is a table illustrating, by way of example, the categories and subcategories of various costs that may be taken into consideration in formulating a composite report (master worksheet) in accordance with the present invention.

FIG. 7 is a table describing, in greater detail, the steps schematically illustrated in FIG. 6.

FIG. 8 is a table listing steps included in still another embodiment of a balance sheet generation method in accordance with the present invention.

FIG. 10 is an example of an ERP costs data report table in accordance with the present invention.

FIG. 11 is an example of an intermediate pivot table in accordance with the present invention.

FIG. 12 is an example of summary pivot table in accordance with the present invention.

DESCRIPTION OF EXEMPLARY
EMBODIMENTS OF THE INVENTION

Figure 1:
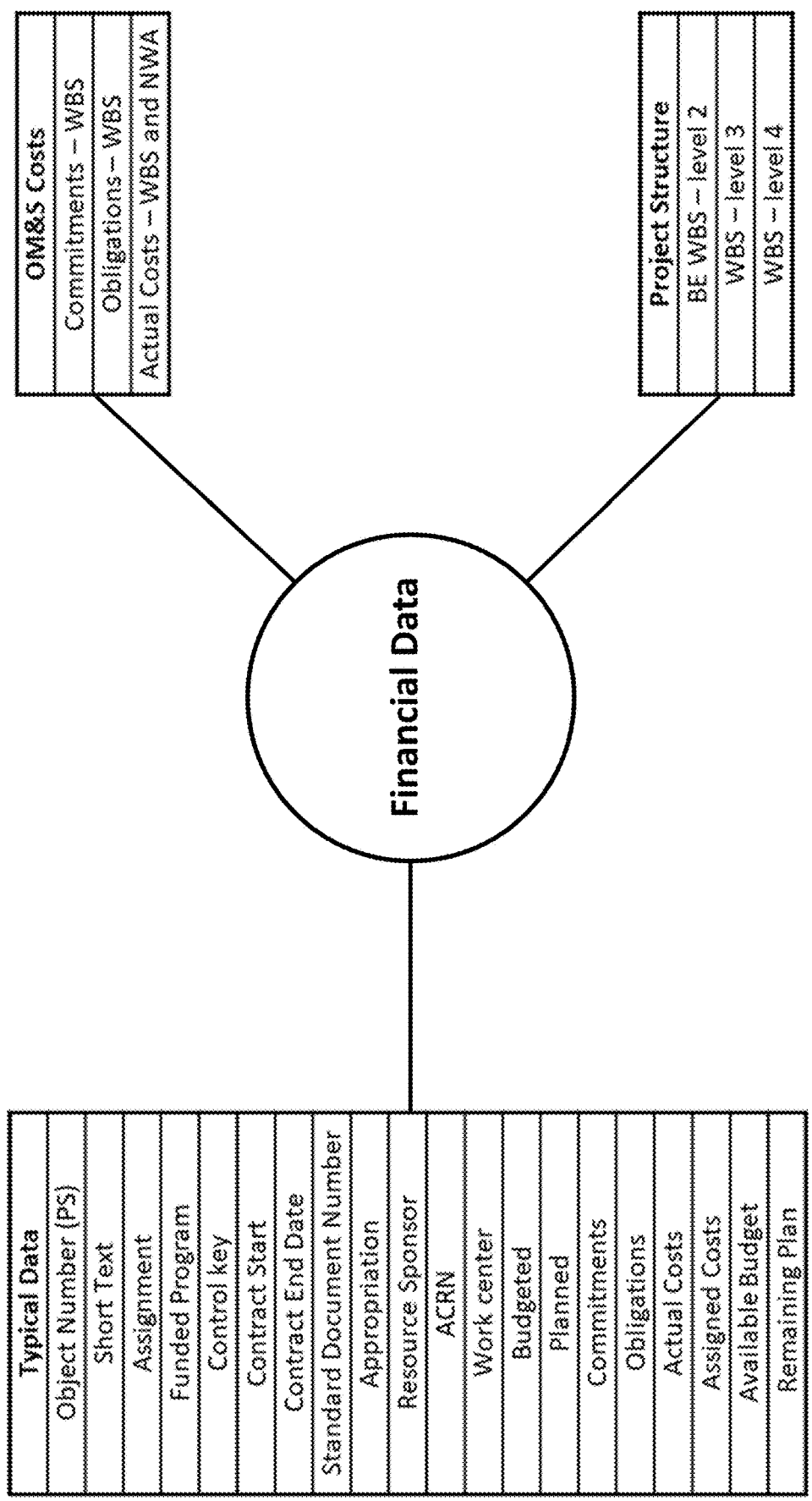
FIG. 1 is diagram indicating three main components of financial data, viz., typical data, OM&S costs, and Project Structure, and further indicating respective subcomponents of each component.

Referring now to FIGS. 1 through 5, exemplary inventive practice conceives of financial data as encompassing typical data, project structure, and OM&S costs. As shown in FIG. 1, the three kinds of OM&S costs are commitments, obligations, and actual costs. All three kinds of OM&S costs—viz., those designated as "commitments," "obligations," and "actual costs"—are contained in the billing element (BE) work breakdown structure (WBS). In addition, the kind of OM&S cost designated as "other actual costs" is contained in the network activities (NWA).

As shown in FIG. 2, ERP transaction code S_ALR_87013542 is capable of delimiting OM&S costs in terms of four cost elements as contained in three cost element categories, viz., 1511.2000, 6790.3000, and 6790.5000. It is notable that the four cost elements for ERP transaction code S_ALR_87013542 somewhat parallel the five OM&S categories defined by Secretary of the Navy Instruction 5200.44 ("Operating Materials and Supplies—Accountability and Management"), 29 Mar. 2019, which are listed in FIG. 3. See also DoD Financial Regulation, Volume 11B, Chapter 56 ("Operating Materials and Supplies"), December 1994.

For purposes of evaluating accuracy, convenience, and processing time, the present inventors tested their methodology with respect to sixty-four funding documents. Generally speaking, accuracy was considered the most important factor, while time and convenience pertained to ease of accomplishment by project managers and project business financial managers. The financial data were inventively obtained by using transaction codes S_ALR_87013542, ZRQIS0003, and ZRQIS0002. Typical financial data were taken from ERP transaction code ZRQIS0003. Project structure data (the lower level WBS) were taken from ZRQIS0002. OM&S costs were taken from transaction code S_ALR_87013542. Four reports were derived from S_ALR_87013542, one report was derived from ZRQIS0003, and one report was derived from ZRQIS0002.

Figure 4:
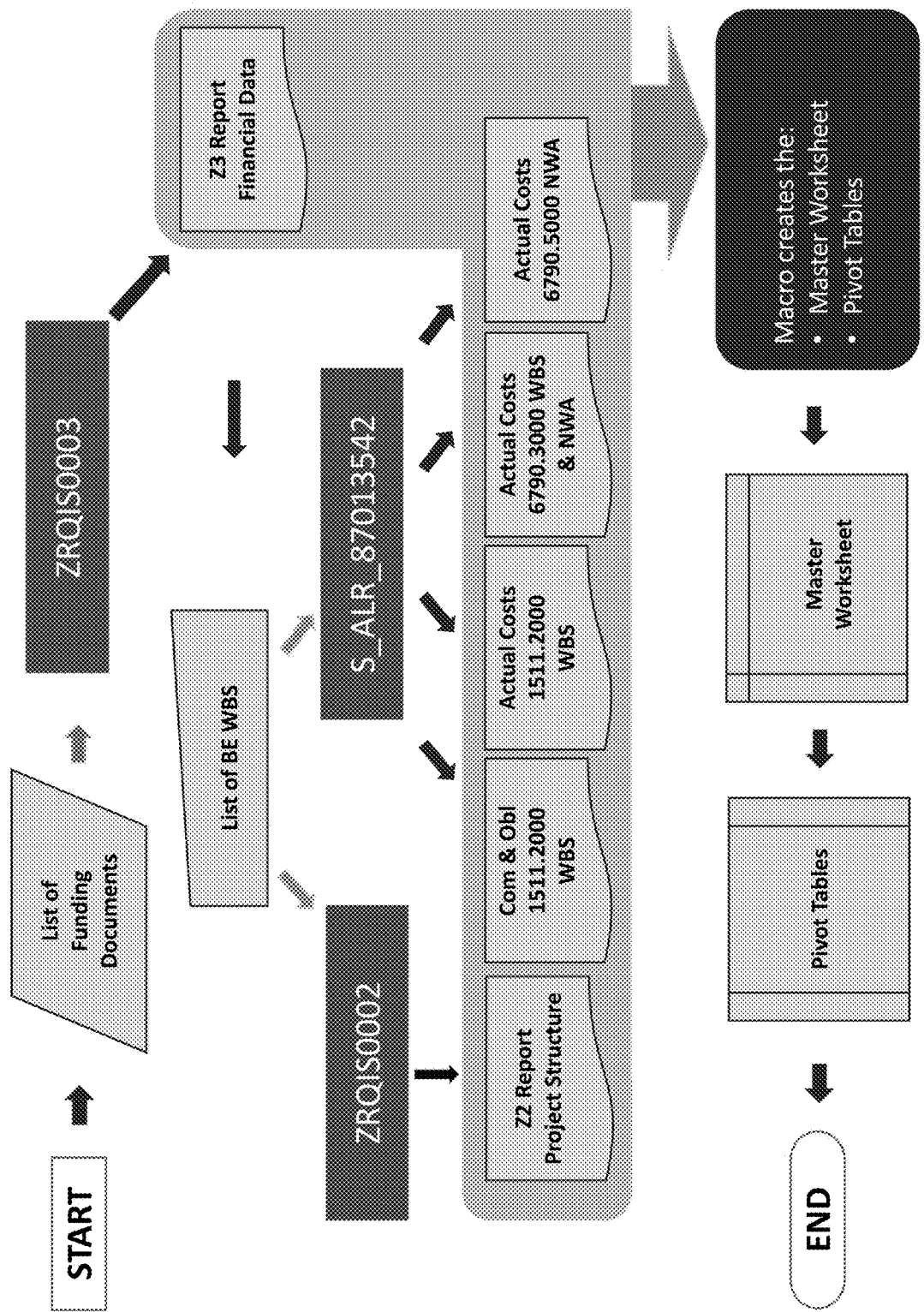
FIG. 4 is a schematic illustrating an embodiment of a balance sheet generation method in accordance with the present invention.

As illustrated in FIG. 4, according to an exemplary inventive embodiment six ERP reports were data-filtered in order to attain a balance sheet that was to include OM&S costs. Six reports in total were exported from ERP and imported, respectively, into six Excel worksheets. Macros were executed to produce the balance sheet. In particular, the macros were executed to produce a composite report (synonymously referred to herein as a "master worksheet") and pivot tables. The master worksheet displayed the following: the original costs from the ZRQIS0003 report (left column of FIG. 5); the OM&S costs from the S_ALR_87013542 reports (middle column of FIG. 5); and total costs (right column of FIG. 5). The total costs were obtained by adding the OM&S costs to the original costs. The execution time for the macros was less than one minute. The overall time to retrieve the six ERP reports in the demonstration was about 30 minutes. With some approximation, it may be expected that this time will increase proportionally for a practitioner of the present invention, as the number of funding documents increases.

The accuracy of the inventive embodiment was evaluated by comparing the available budget calculated by the inventive method to the funds remaining from the ERP transaction code ZRQIS0001 report, on the assumption that the ZRQIS0001 report provides the correct balance by sale orders. The calculated available budget, considered along with OM&S costs, equals the funds remaining as described by the ZRQIS0001 report. That is:

[Available Budget(ZRQIS0003)]−[*OM&S* Costs]= [Funds Remaining(ZRQIS0001)]

A premise of this comparison to the ZRQIS0001 report was that, in order to be accurate, the inventive method must account for all OM&S costs in order to have the calculated available budget agree with the value from the ZRQIS0001 report.

When the available budget calculated by an embodiment of the inventive method was compared to the funds remaining from a ERP ZRQIS0001 report, good agreement was found for funding documents that do not have OM&S costs. There were sixteen funding documents with OM&S costs, and in this case good agreement was found for eight funding documents. For the other eight funding documents the difference between the calculated available budget and the funds remaining was about a few hundred dollars, except for one. In the absence of further investigation, among the possible explanations for these differences is that not all OM&S costs were assigned to the correct cost elements or to the correct funding documents.

Exemplary practice of the present invention reports expenses including OM&S costs, Budget, and Available Budget. The inventive method demonstrated that it could match the funds remaining from the ZRQIS0001 report when there were no OM&S costs. The correct reporting of OM&S costs is still problematical insofar as causing disagreement between the calculated available budget and funds remaining for a small number of funding documents.

The present inventors also compared five different ERP transaction codes with regard to determining OM&S costs. Each transaction code was tested in its ability to determine OM&S costs, and was rated in terms of accuracy, time, and convenience for the user. A transaction code was rated as accurate if it found all of the OM&S costs. The five ERP transaction codes that were evaluated were: ERP transaction code ZRQIS0002 (Budget Hierarchy Report); ERP transaction code ZRQIS0003 (Project Hierarchy Report); ERP transaction code CJI3 (Actual Line Items Report); ERP transaction code CJI5 (Commitment Line Items Report); and ERP transaction code S_ALR_87013542 (Project Plan/Actual/Variance). Many project managers and project business financial managers were familiar with ERP transaction codes ZRQIS0002, ZRQIS0003, CJI3, and CJI5. The ERP transaction code S_ALR_87013542 was not as well-known as the other four transaction codes.

In the comparative study testing of the five transaction codes, ERP transaction code ZRQIS0002 was found to be accurate but rated low on time and convenience. The OM&S costs were found by manually drilling down on the commitments, obligations, and actual costs at the Billing Element (BE) Work Breakdown Structure (WBS). As the number of projects would increase, the number of times the user had to manually drill down would increase by a factor of three. The transaction code ZRQIS0003 was able to organize the financial data in an abbreviated project structure showing the Billing Element Work Breakdown Structure (BE WBS) and the Network Activities (NWA) by funding documents. This attribute was found only in the ZRQIS0003 report, while other ERP reports such as the ZRQIS0002 report lacked this desired detail. The ZRQIS0003 report displayed the OM&S costs by drilling down at the three different costs (commitments, obligations, and actual costs) in much the same way as described hereinabove for the ZRQIS0002.

The ERP transaction codes CJI3 and CJI5 were the standard ERP vehicles in the industry to determine the OM&S costs. In the study, the CJI3 transaction code was found to be accurate and easier to use than the ZRQIS0002 transaction code and the ZRQIS0003 transaction code. The CJI5 transaction code was found to be inaccurate. Several commitments and obligations did not show up in the CJI5 report, but were itemized in the ZRQIS0002 report and the S_ALR_87013542 report. The S_ALR_87013542 transaction code was found to be a good alternative for both the CJI3 transaction code and the CJI5 transaction code.

Unlike the four other transaction codes being tested, the ERP transaction code S_ALR_87013542 was capable of accepting inputs as projects, work breakdown structure (WBS) elements, and networks. The OM&S costs were determined by entering the BE WBS to represent multiple funding documents. As shown in FIG. 2, the OM&S costs were found at three cost elements: 1511.2000 (OM&S Held for Use); 6790.3000 (Other Expense and Budget); and 6790.5000 (Other Expenses Not Requiring Budgetary Resources).

The present inventors inventively availed themselves of the unique capabilities of the S_ALR_87013542 transaction code. The three cost elements were readily displayed in the S_ALR_87013542 report. The OM&S costs were acquired by drilling down on the three types of costs (commitments, obligations, and actual costs) at the three costs elements (1511.2000; 6790.3000); 6790.5000). Generally speaking, commitment costs and obligation costs are related to each other, and together are clearly distinguishable from actual costs. Accordingly, it may be convenient to consider the three types of costs—viz., commitments, obligations, and actual costs—as constituting two categories of costs, viz., (i) commitments and obligations, and (ii) actual costs.

For the cost element 1511.2000 there were two reports. One report corresponding to cost element 1511.2000 showed the OM&S costs at the WBS as actual costs. The second report corresponding to cost element 1511.2000 showed the OM&S costs at the WBS as commitments and obligations. For the cost element 6790.3000, the corresponding report showed OM&S costs at both the WBS and the NWA as actual costs. For the cost element 6790.5000, the corresponding report showed OM&S costs at the NWA as actual costs. The "drill down" technique —specifically, drilling down on (i) commitments and obligations and (ii) actual costs—was used four times, and was effectuated independently of the number of funding documents or projects. The S_ALR_87013542 transaction code was found to be accurate, and most efficient as compared to the four other reports (ZRQIS0002; ZRQIS0003; CJI3; CJI5), for retrieving OM&S costs.

In an example of inventive practice, the present inventors started with the data from a ZRQIS0003 report in order to generate a composite report (master worksheet). Typically, OM&S costs appeared at the billing element work breakdown structure (BE WBS), the two lower level (levels 3 and 4) WBSs, and at the network activities (NWAs). The ZRQIS0003 report would sometimes show the OM&S costs at the BE WBS, but did not display them at the NWAs. The ZRQIS0003 report also would not display the two lower level WBSs below the BE WBS. The lower level WBSs and their titles were obtained from the ERP ZRQIS0002 report and inserted into the ZRQIS0003 data to create a more detailed project structure.

In this example, the ERP transaction code S_ALR_87013542 was used to obtain the OM&S costs at the BE WBS, lower level WBSs, and NWAs. On a few occasions OM&S costs would show up for the same BE WBS in both the ZRQIS0003 and S_ALR_87013542 reports. The present inventors decided to include the OM&S costs from the ZRQIS0003 in the composite report, but exclude the OM&S costs from the S_ALR_87013542 in the composite report. This decision was based on a comparison between the available budget calculated in this example, versus the available budget calculated by the ERP transaction code ZRQIS0001 (Project Funding Report). Agreement between the two calculations was found by not including the OM&S costs for the WBS at the BE as indicated in the S_ALR_87013542 report.

A non-inventive approach to creating a composite report (master worksheet) in Excel would represent a tedious and time-consuming proposition especially prone to human error, such as involving manual gathering and assembling of items of information—e.g., inserting formulas, cutting, copying, and pasting among multiple worksheets having millions of pieces of data. In contrast, exemplary inventive practice provides for at least one data-filtering macro in Excel, such as written in the computer language known as Visual Basic for Applications. The one or more inventive macros afford an automation that reduces the time it takes to organize and generate a composite report.

Generally speaking, a typical Microsoft Excel document (file) displays one or more tabbed worksheets, with the number of tabbed worksheets at the option of the Excel user. For instance, if the Excel document displays three tabbed worksheets, then Excel labels these worksheets as "Sheet1," "Sheet2," and "Sheet3," respectively. In general, a pivot table is a data summarization tool that can automatically sort and sum data, such as data contained in a more extensive table. By "pivoting" (arranging and rearranging) statistics, a pivot table serves to set forth or emphasize useful or particularly useful information. Microsoft Excel software has a general built-in capability of displaying pivot tables in separate worksheets. Exemplary inventive practice creates, by means of at least one macro, a visually and informatively enhanced presentation of a balance sheet in the form of a pivot table, such as shown by way of example in FIGS. 11 and 12. The pivot-tabular balance sheet shown in FIG. 12 displays the budgeted amount, assigned costs with and without OM&S costs, OM&S costs, and available budget with OM&S costs by funding document (standard document number). The user is able to customize the pivot-tabular balance sheet with simple clicks of the computer mouse. For instance, in accordance with a customizable pivot table's many features, filters may be applied to display specific funding documents, resource sponsors, or contract end dates. The user may choose to change the design style of a pivot table, and/or display various other data on a master worksheet or other pivot table.

Depending on the inventive embodiment, a composite report (master worksheet) may contain at least some of the following columnar designations (and/or other columnar designations not enumerated among the following): Object Number (PS); Short Text; Assignment; Funded Program; Control Key; Actual Work; Contract End Date; Standard Document; Appropriation; Resource Sponsor; ACRN (Accounting Classification Reference Number); Work Center; Budgeted; Planned; Commitments; Obligations; Actual Costs; Assigned Costs; Available Budget; Remaining Planned; *Commitments; *Obligations; *Actual Costs; *Assigned Costs; Commitments; Obligations; Actual Costs; Assigned Costs; Available Budget; Remaining Planned; Owner.

An exemplary inventive method uses ERP transaction code S_ALR_87013542 and an Excel macro to data-filter the data from six ERP reports and to present the resulting balance sheet data in the form of one or more pivot tables. The transaction code S_ALR_87013542 was shown to be accurate and more convenient in determining the OM&S costs than any other ERP methods such as CJI3 and CJI5. As uniquely featured by a report inventively obtained via ERP transaction code S_ALR_87013542, desired OM&S costs are segregated and displayed in three cost element categories (1511.2000, 6790.3000, and 6790.5000). This feature is available to other ERP reports only by manually customizing for instance the CJI3 and CJI5 reports. The generation of the balance sheet to show expenses, including the OM&S costs, budget, and available budget, requires the manipulation of hundreds to millions of pieces of data, depending on the number of funding documents. Previous to the present invention, this task has been accomplished in Excel by hand, e.g., by inserting formulas, cutting, copying, and pasting among multiple worksheets. In contrast, exemplary practice of the present invention takes advantage of the capabilities of Excel so as to implement one or more macros to perform data-filtering and to generate one or more pivot-tabular visual presentations of a balance sheet, thereby facilitating the generation of balance sheets.

Alternative methods to retrieve the OM&S costs are ZRQIS0002, ZRQIS0003, CJI3, and CJI5 reports. The ZRQIS0002 and ZRQIS0003 are accurate but more time-consuming to use than the S_ALR_87013542 report. It was found that OM&S costs from CJI3 report are in agreement with the S_ALR_87013542 report. The CJI5 report was found to be incorrect and should not be used. The S_ALR_87013542 report was found to be accurate and most convenient for the user. An alternative to generating the balance sheet is insert formula, cut and paste the data by hand, but is time-consuming and tedious. The mentioned alternatives may lead to incorrect reporting of the OM&S cost and a lot of time required to get to the wrong results.

Figure 6:
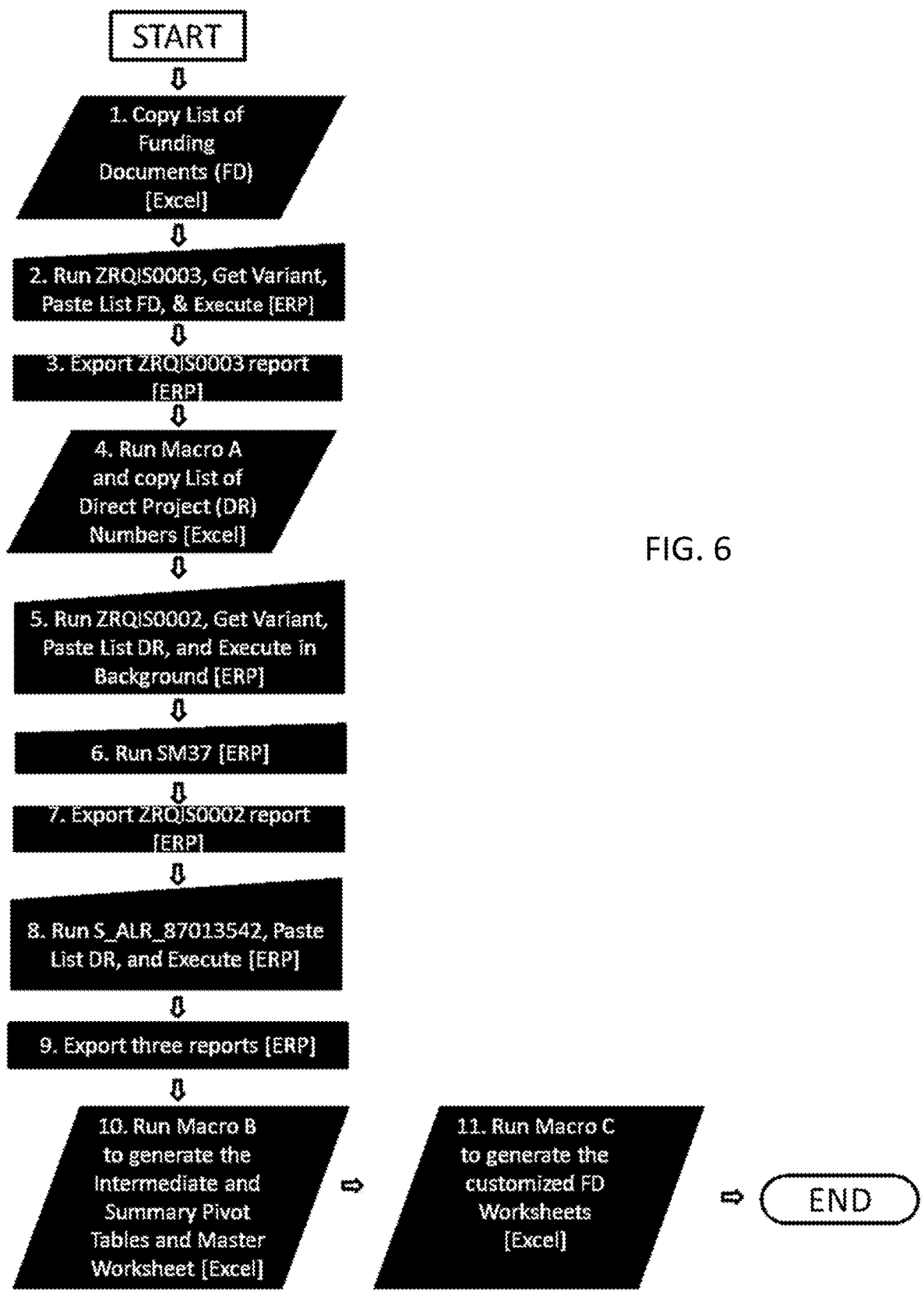
FIG. 6 is a schematic illustrating another embodiment of a balance sheet generation method in accordance with the present invention.

With reference to FIGS. 6 through 12, exemplary practice of the present invention uses data in ERP and pivot tables in Microsoft Excel. According to exemplary inventive practice, several large sets of financial data, such as shown in FIG. 10, are exported from ERP and saved on the user's computer. The alpha-numeric data, consisting of a mixture of text and numbers, are imported into multiple Excel worksheets to be processed. The present inventors developed macros using the computer language Visual Basic for Applications (VBA) in Excel. As illustrated by way of example in FIG. 9, the present invention's implementation of one or more macros automates the process of generating a balance sheet. Other embodiments of the present invention are shown respectively in FIGS. 6 and 7 and in FIG. 8. FIGS. 6 through 8 are each schematically illustrative of exemplary inventive practice, wherein one or more Excel macros are produced to retrieve financial data from ERP, and one or more pivot tables are created to organize, categorize, and manipulate the financial data.

Figure 9:
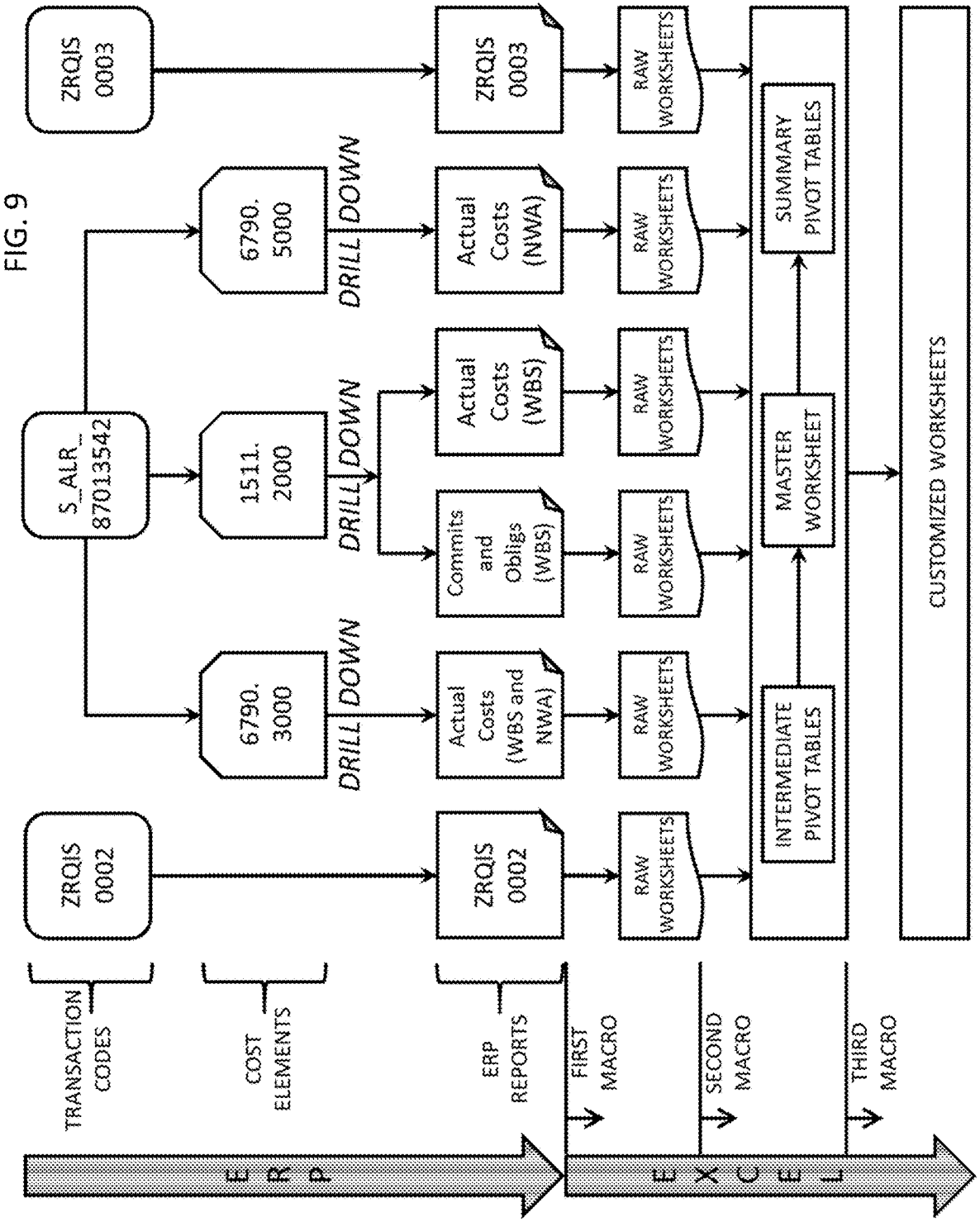
FIG. 9 is a schematic illustrating yet another embodiment of a balance sheet generation method in accordance with the present invention.

Particularly with reference to FIG. 9, an exemplary inventive embodiment includes three macros. A first macro is used to import the data, from the ERP reports, to separate "raw" worksheets in Excel. A second macro creates pivot tables, which are utilized to speed up the data processing by organizing data for finding and extracting the desired data. The data are further organized, categorized, and manipulated by the second macro to create the composite report (master worksheet) and one or more summary pivot tables, such as a "Standard 1" or an "Available Budget" pivot table. A third macro is used to extract data from the summary pivot table(s) to create customized worksheets for specific funding documents.

In comparison to writing VBA code, creating pivot tables was found by the present inventors to be a more efficient way for accomplishing same or similar tasks of manipulating data. The present invention's pivot tables served two functions. First, at least one intermediate presentation pivot table was implemented as "intermediate" means to summarize particular sets of data for further processing by the inventive macro(s). Second, at least one summary presentation pivot table was implemented as "summary" means to display financial data in a dynamically customizable fashion. Many inventive embodiments create several intermediate pivot tables, an example of which is the intermediate pivot table shown in FIG. 11 (which is an abbreviated version of a larger table).

As shown in FIG. 10, the data from ERP are presented in columns setting forth the date, network activity, costs, and material description. The same Network Activity appears in several instances with material purchases. An intermediate pivot table, such as that shown in FIG. 11, succeeds in calculating the total cost for each NWA. A master worksheet (composite report), which itself is a pivot table, contains data from ERP reports and intermediate pivot tables. A summary pivot table allows the user to customize the data to be finally presented. The summary pivot table draws its data from a larger data set, viz., the master worksheet.

U.S. Pat. No. 10,282,407 B1 to inventor Gilbert F. Lee, issue date 7 May 2019, is pertinent to the instant disclosure and is hereby incorporated herein by reference.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for generating a balance sheet based on information contained in an enterprise resource planning system, the method comprising:
   in an enterprise resource planning system, selecting at least one transaction code that includes a plurality of cost elements that are each substantially directed to operating materials and supplies costs;
   in said enterprise resource planning system, generating a plurality of enterprise resource planning reports, wherein said generating of said plurality of said enterprise resource planning reports includes drilling down, with respect to said plurality of said cost elements, to costs associated with commitments, obligations, and actual costs, and wherein said generating of each said enterprise resource planning report includes drilling down, with respect at least one said cost element, to costs associated with at least one of said commitments, said obligations, and said actual costs;
   producing at least three macros in a spreadsheet program, said at least three macros including a first macro, a second macro, and a third macro, wherein each said macro is used for generating at least one tabbed worksheet;
   generating a plurality of said tabbed worksheets in said spreadsheet program, wherein said plurality of tabbed worksheets includes a plurality of raw spreadsheet worksheets, a plurality of intermediate pivot table worksheets, a composite spreadsheet report worksheet, a plurality of summary pivot table worksheets, and a plurality of customized spreadsheet worksheets, wherein said generating of each said tabbed worksheet is performed using a said macro, wherein each said tabbed worksheet is characterized by a tab usable for accessing said worksheet, wherein said generating of said plurality of said tabbed worksheets in said spreadsheet program includes:
      generating said plurality of said raw spreadsheet worksheets, wherein said generating of said plurality of said raw spreadsheet worksheets is performed using said first macro and includes importing data from every said enterprise resource planning report, wherein said generating of each said raw spreadsheet worksheet includes importing data from at least one said enterprise resource planning report;
      generating said plurality of said intermediate pivot table worksheets, wherein said generating of said plurality of said intermediate pivot table worksheets is performed using said second macro and includes organizing data from every said raw spreadsheet worksheet, wherein said generating of each said intermediate pivot table worksheet includes organizing data from at least one said raw spreadsheet worksheet;
      generating said composite spreadsheet report worksheet, wherein said generating of said composite spreadsheet report worksheet is performed using said third second macro and includes combining data from every said pivot table worksheet;
      generating said plurality of said summary pivot table worksheets in said spreadsheet program, wherein said generating of said plurality of said summary pivot table worksheets is performed using said second macro and includes organizing data from said composite spreadsheet report worksheet, wherein said generating of each said summary pivot table worksheet includes organizing data from said composite spreadsheet report worksheet;
      generating said plurality of said customized spreadsheet worksheets in said spreadsheet program, wherein said generating of said plurality of said customized spreadsheet worksheets is performed using said third macro and includes organizing data from every said summary pivot table worksheet and from said composite spreadsheet report worksheet, wherein said generating of each customized spreadsheet worksheet includes organizing data from at least one of: (i) said composite spreadsheet report worksheet; (ii) at least one said summary pivot table worksheet;
      navigating between said tabbed worksheets, wherein said navigating includes accessing every said tabbed worksheet by using the corresponding said tab.

2. An apparatus comprising a computer having computer code characterized by computer program logic for enabling said computer to generate a balance sheet based on information contained in an enterprise resource planning system, said computer code being executable by said computer so that, in accordance with said computer program logic, said computer performs acts including:

in an enterprise resource planning system, selecting at least one transaction code that includes a plurality of cost elements that are each substantially directed to operating materials and supplies costs;

in said enterprise resource planning system, generating a plurality of enterprise resource planning reports, wherein said generating of said plurality of said enterprise resource planning reports includes drilling down, with respect to said plurality of said cost elements, to costs associated with commitments, obligations, and actual costs, and wherein said generating of each said enterprise resource planning report includes drilling down, with respect at least one said cost element, to costs associated with at least one of said commitments, said obligations, and said actual costs;

producing at least three macros in a spreadsheet program, said at least three macros including a first macro, a second macro, and a third macro, wherein each said macro is used for generating at least one tabbed worksheet;

generating a plurality of said tabbed worksheets in said spreadsheet program, wherein said plurality of tabbed worksheets includes a plurality of raw spreadsheet worksheets, a plurality of intermediate pivot table worksheets, a composite spreadsheet report worksheet, a plurality of summary pivot table worksheets, and a plurality of customized spreadsheet worksheets, wherein said generating of each said tabbed worksheet is performed using a said macro, wherein each said tabbed worksheet is characterized by a tab usable for accessing said worksheet, wherein said generating of said plurality of said tabbed worksheets in said spreadsheet program includes:

generating said plurality of said raw spreadsheet worksheets, wherein said generating of said plurality of said raw spreadsheet worksheets is performed using said first macro and includes importing data from every said enterprise resource planning report, wherein said generating of each said raw spreadsheet worksheet includes importing data from at least one said enterprise resource planning report;

generating said plurality of said intermediate pivot table worksheets, wherein said generating of said plurality of said intermediate pivot table worksheets is performed using said second macro and includes organizing data from every said raw spreadsheet worksheet, wherein said generating of each said intermediate pivot table worksheet includes organizing data from at least one said raw spreadsheet worksheet;

generating said composite spreadsheet report worksheet, wherein said generating of said composite spreadsheet report worksheet is performed using said third second macro and includes combining data from every said pivot table worksheet;

generating said plurality of said summary pivot table worksheets in said spreadsheet program, wherein said generating of said plurality of said summary pivot table worksheets is performed using said second macro and includes organizing data from said composite spreadsheet report worksheet, wherein said generating of each said summary pivot table worksheet includes organizing data from said composite spreadsheet report worksheet;

generating said plurality of said customized spreadsheet worksheets in said spreadsheet program, wherein said generating of said plurality of said customized spreadsheet worksheets is performed using said third macro and includes organizing data from every said summary pivot table worksheet and from said composite spreadsheet report worksheet, wherein said generating of each customized spreadsheet worksheet includes organizing data from at least one of: (i) said composite spreadsheet report worksheet; (ii) at least one said summary pivot table worksheet;

navigating between said tabbed worksheets, wherein said navigating includes accessing every said tabbed worksheet by using the corresponding said tab.

3. A computer program product for generating a balance sheet based on information contained in an enterprise resource planning system, the computer program product comprising a non-transitory computer-readable storage medium having computer-readable program code portions stored therein for execution by a computer, the computer-readable program code portions including:

a first executable portion, for selecting at least one transaction code in an enterprise resource planning system, wherein each said transaction code includes a plurality of cost elements that are each substantially directed to operating materials and supplies costs;

a second executable portion, for generating a plurality of enterprise resource planning reports in said enterprise resource planning system, wherein said generating of said plurality of said enterprise resource planning reports includes drilling down, with respect to said plurality of said cost elements, to costs associated with commitments, obligations, and actual costs, and wherein said generating of each said enterprise resource planning report includes drilling down, with respect at least one said cost element, to costs associated with at least one of said commitments, said obligations, and said actual costs;

a third executable portion, for producing at least three macros in a spreadsheet program, said at least three macros including a first macro, a second macro, and a third macro, wherein each said macro is used for generating at least one tabbed worksheet;

a fourth executable portion, for generating a plurality of said tabbed worksheets in said spreadsheet program, wherein said plurality of tabbed worksheets includes a plurality of raw spreadsheet worksheets, a plurality of intermediate pivot table worksheets, a composite spreadsheet report worksheet, a plurality of summary pivot table worksheets, and a plurality of customized spreadsheet worksheets, wherein said generating of each said tabbed worksheet is performed using a said macro, wherein each said tabbed worksheet is characterized by a tab usable for accessing said worksheet, wherein said fourth executable portion includes at least three worksheet-generative executable sub-portions, said at least three worksheet-generative executable sub-portions including;

a first executable worksheet-generative sub-portion, for generating said plurality of said raw spreadsheet worksheets in said spreadsheet program, wherein said generating of said plurality of said raw spreadsheet worksheets is performed using said first macro and includes importing data from every said enterprise resource planning report, wherein said generating of each said raw spreadsheet worksheet includes importing data from at least one said enterprise resource planning report;

a second executable worksheet-generative sub-portion, for generating said plurality of said intermediate pivot table worksheets in said spreadsheet program, wherein said generating of said plurality of said intermediate pivot table worksheets is performed using said second macro and includes organizing data from every said raw spreadsheet worksheet, wherein said generating of each said intermediate pivot table worksheet includes organizing data from at least one said raw spreadsheet worksheet;

a third executable worksheet-generative sub-portion, for generating said composite spreadsheet report in said spreadsheet program, wherein said generating of said composite spreadsheet report worksheet is performed using said second macro and includes combining data from every said pivot table worksheet;

a fourth executable worksheet-generative sub-portion, for generating said plurality of said summary pivot table worksheets in said spreadsheet program, wherein said generating of said plurality of said summary pivot table worksheets is performed using said second macro and includes organizing data from said composite spreadsheet report worksheet, wherein said generating of each said summary pivot table worksheet includes organizing data from said composite spreadsheet report worksheet;

a fifth executable worksheet-generative sub-portion, for generating said plurality of said customized spreadsheet worksheets in said spreadsheet program, wherein said generating of said plurality of said customized spreadsheet worksheets is performed using said third macro and includes organizing data from every said summary pivot table worksheet and from said composite spreadsheet report worksheet, wherein said generating of each customized spreadsheet worksheet includes organizing data from at least one of: (i) said composite spreadsheet report worksheet; (ii) at least one said summary pivot table worksheet;

a fifth executable portion, for navigating between said tabbed worksheets, wherein said navigating includes accessing every said tabbed worksheet by using the corresponding said tab.

\* \* \* \* \*